L. H. PERLMAN.
WHEEL.
APPLICATION FILED JAN. 10, 1917.
1,303,590.
Patented May 13, 1919.
3 SHEETS—SHEET 2.
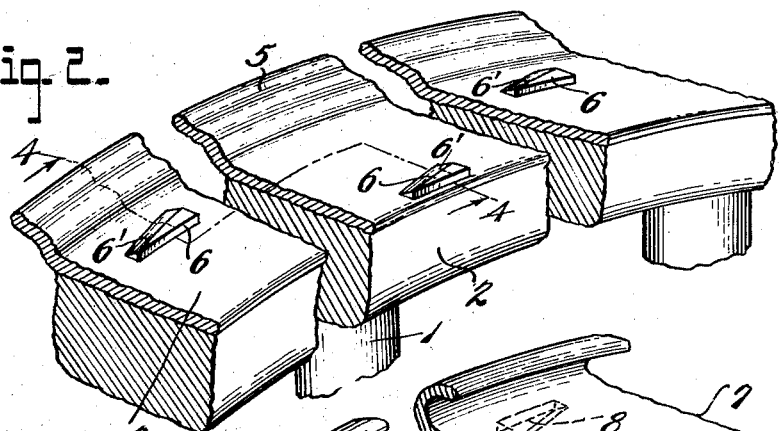
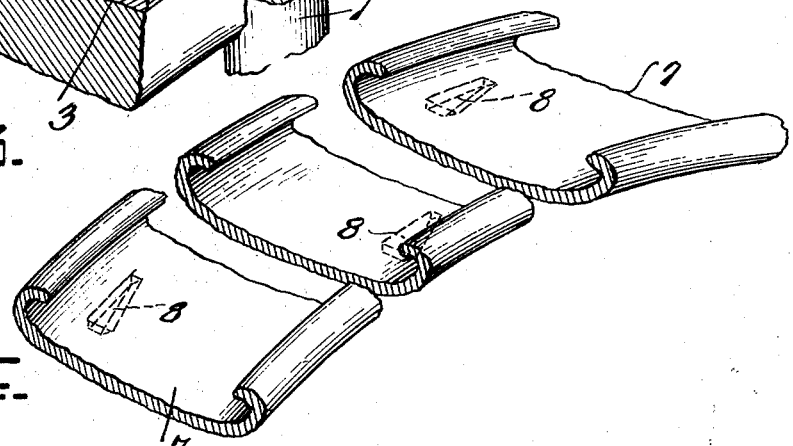
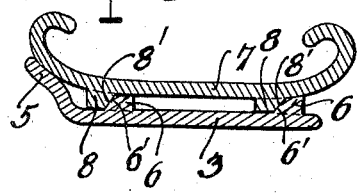
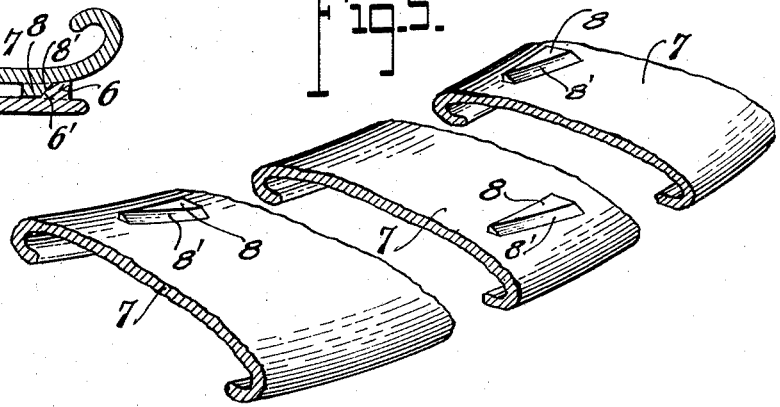
Witness
E. H. Wagner,
C. H. Fesler
Inventor
Louis H. Perlman
By Edgar M. Kitchin,
His Attorney, L. H. PERLMAN.
WHEEL.
APPLICATION FILED JAN. 10, 1917.
1,303,590.
Patented May 13, 1919.
3 SHEETS—SHEET 3.
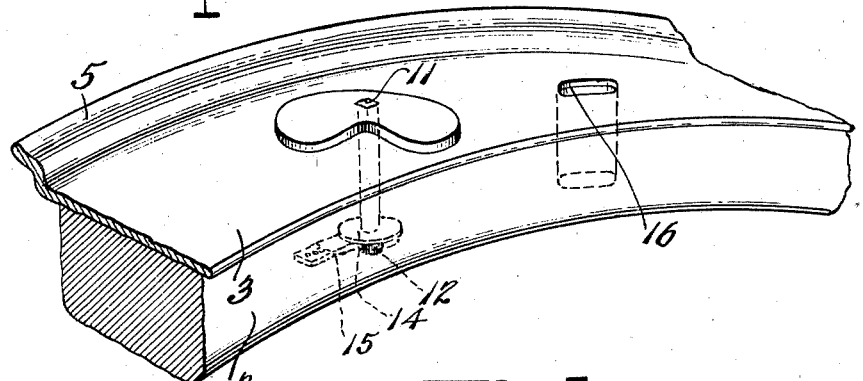
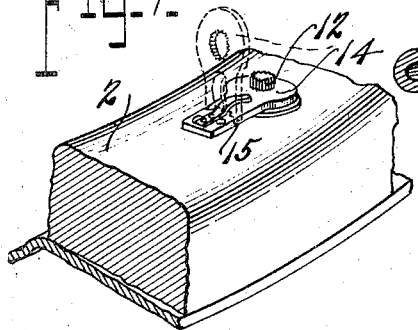
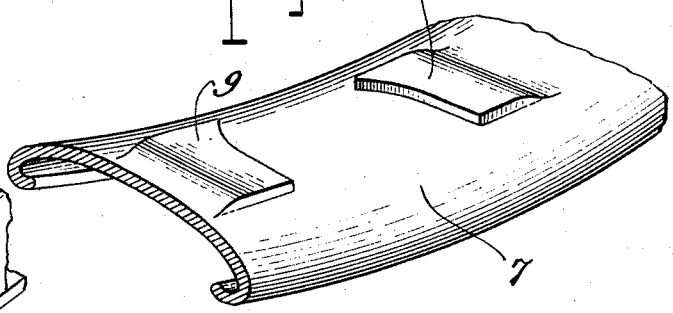
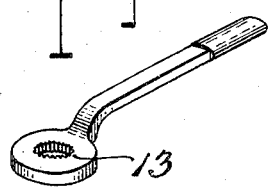
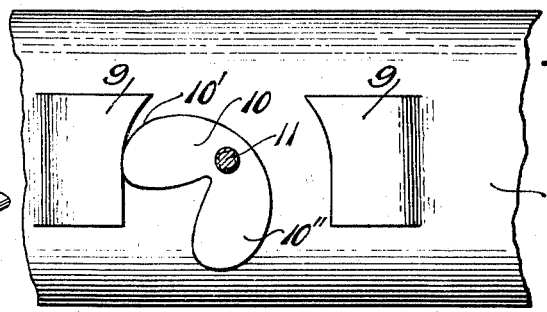
Inventor
Louis H. Perlman
Witness
E. H. Wagner,
C. H. Fesler
By Edgar M. Kitchin,
His Attorney

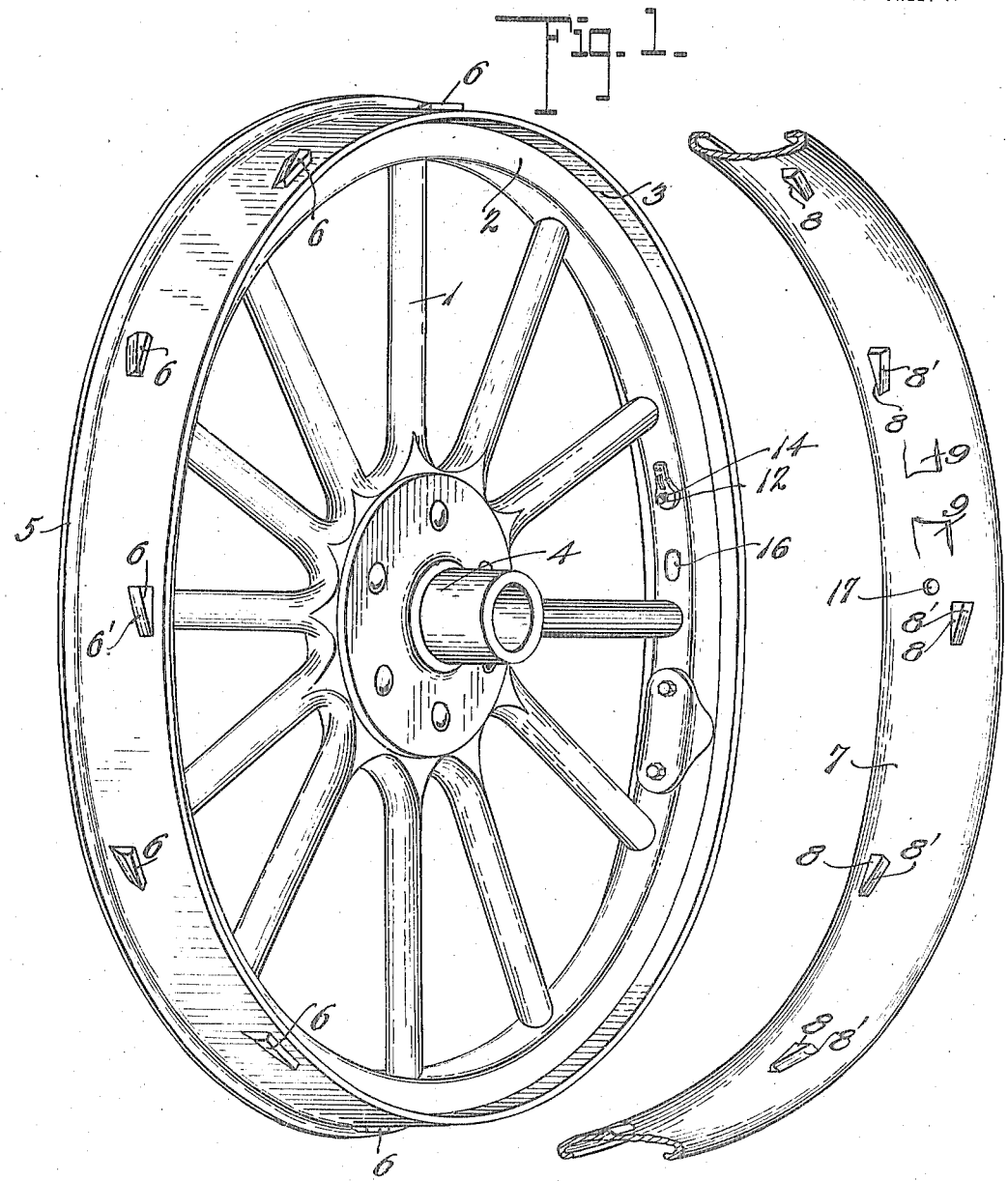

UNITED STATES PATENT OFFICE.

LOUIS H. PERLMAN, OF NEW YORK, N. Y.

WHEEL.

1,303,590.

Specification of Letters Patent.

Patented May 13, 1919.

Application filed January 10, 1917. Serial No. 141,635.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in demountable rim wheels such as are especially well adapted for use on automobiles and like vehicles.

The object in view is the provision of means for quickly and efficiently locking a demountable rim on a wheel in a manner adapting the rim to be easily and quickly removed while assuring maintenance of the rim in an effectively tensioned condition while in use on the wheel.

A further object in view is the provision of means adapted to be carried by the wheel body for actuating a demountable rim and shifting the same to and from a position locked on the wheel body.

With these and further objects in view as will in part hereinafter be stated and in part become apparent, the invention comprises certain novel constructions, combinations and arrangements of parts as subsequently specified and claimed.

In the accompanying drawings,—

Figure 1 is a perspective view of a wheel embodying the features of the present invention, the rim being shown in section and displaced from its operative position on the wheel.

Fig. 2 is an enlarged, detail, fragmentary perspective of various sections of the wheel body juxtaposed for indicating the relative position of the rim retaining wedges.

Fig. 3 is a similar view of fragments of the demountable rim showing in dotted lines the coöperating rim-carried wedges.

Fig. 4 is a transverse section taken on planes indicated by line 4—4 of Fig. 2, but taken only through the felly band and demountable rim, the demountable rim being indicated as mounted upon and in its operative relation to the felly band.

Fig. 5 is a view similar to Fig. 3 of the same parts seen in an inverted position.

Fig. 6 is a fragmentary perspective view of a segment of that portion of the felly and felly band which carries the demountable rim actuating cam.

Fig. 7 is an inverted plan of the same, parts being broken away.

Fig. 8 is a sectional perspective view of a fragment of the rim inverted.

Fig. 9 is a detail, perspective view of the cam shaft operating tool.

Fig. 10 is a plan view of the parts seen in Fig. 8, the actuating cam being also shown in its operative relation thereto.

Referring to the drawings by numerals, 1 indicates the spokes, 2 the felly and 3 the felly band of the wheel body which is provided with the usual hub 4. The felly band 3 is provided with the usual supporting stop flange 5 and coöperating therewith for sustaining a demountable rim, wedge plates 6, 6 are provided on the exterior face of the band 3, the plates 6 being spaced uniformly about the band 3, and being alternately positioned adjacent the edges of the band. There is thus provided a plate 6 near the outer edge of the band and then a plate 6 near the inner edge thereof, and so on about the periphery of the wheel body. The wedge plates 6 may be formed of material separate from the band and welded or otherwise fixed thereto, or may be stamped directly from the material of the band itself. Each wedge plate 6 tapers longitudinally in the direction of the curve of the felly band 3, and in the direction of drive of the wheel. In addition to tapering longitudinally, each of the plates 6 has its inner edge tapered in a transverse direction, as indicated at 6', whereby each plate 6 provides an inclined surface which has two directions of incline, one with respect to the radius of the wheel and the other with respect to its circumference. Adapted to be mounted on the wheel is a demountable rim 7 designed for carrying the usual pneumatic or other cushioning tire. The wheel 7 is provided with wedge plates 8 corresponding exactly in size, form and arrangement with the plates 6 except that each of the plates 8 is conversely tapered both with respect to the circumference and the axis of the rim, so that an inclined edge 8' is formed on each plate 8 tapering in the direction of curve of the rim and inclined with respect to a radial line proportioned to oppose the taper of the edge 6' of any one plate 6. The plates 8 are uniformly spaced about the rim 7 and correspond in spacing and location to the plates 6, so that when the rim 7 is applied axially onto the wheel body and is rotated thereon the faces 8' engage the faces 6' and ride upon the same. The rim 7' is made larger in diameter than the diameter of the outer face of felly band 3 but smaller in diameter than the flange 5, so that when the rim 7 has been positioned as just described and is rotated independently of the felly band 3 to the final position on the wheel body, the contact of the faces 8' with the faces 6' will effect a wedging action thrusting the rim 7 over into supporting contact with the flange 5 and at the same time exerting a pressure on the rim 7 tending to expand the same. When the rim has assumed this position, during the course of manipulation, it is locked against reverse movement, and is then in position for operation.

To effect positioning of rim 7 in its final operative relation to the wheel, it is necessary to force the same to have a slight amount of rotary movement independent of the wheel body in addition to that which may be given manually. To accomplish this result and to lock the rim in its operative position on the wheel, I provide actuating means seen in detail in Figs. 6 to 10 inclusive. The rim 7 is provided with cam-engaging plates 9, 9, preferably stamped from the material of the base of the rim, but susceptible of being otherwise formed as desired. The plates 9 present curved edges toward each other and are spaced apart a distance adapted to accommodate a cam 10 therebetween, the cam 10 being formed with lobes 10' and 10'', one designed to strike the edge of one of the plates 9 when the cam 10 is rotated in one direction for shifting the rim 7 in a direction of rotation one way for seating the rim in its operative position on the wheel body, and the other lobe being adapted to strike the edge of the other plate 9 when the cam 10 is rotated in the other direction for shifting the rim 7 in the opposite direction for releasing the engagement of the plates 8 with the plates 6 and thereby positioning the rim for being readily removed axially from the wheel body. The cam 10 is fixed to a shaft 11 which extends radially inward through the felly band 3 and felly 2, and at its inner end is shaped to receive an operating tool adapted to rotate the shaft for actuating the cam 10 for shifting the rim 7 as above stated. The tool-receiving end of the shaft 11 may be variously shaped, but is preferably provided with serrations 12 for receiving a serrated operating tool 13.

Since it is imperative that the rim 7 shall be retained against relative rotation with respect to the wheel in order to remain operatively seated on the wheel, it is essential to provide means for locking the rim 7 against accidental or undesired relative movement. To this end, the cam 10 is depended upon to retain the rim in its seated position after seating the same. To prevent undesirable rotation or accidental rotation of the cam 10, the shaft 11 is preferably locked against rotation by the employment of a locking washer 14 similar in shape to the tool 13 and pivotally connected to the felly 2. A spring 15 presses the washer 14 toward the felly so as to maintain the same in locking engagement with the serrated end 12 of shaft 11. When it is desired to rotate the shaft 11, the washer 14 is swung out of engagement with the serrated end 12 against the pressure of the spring 15 to the position indicated in dotted lines in Fig. 7, and while held in this position, leaves the shaft 11 free for rotation. The tool 13 is then applied to the serrated end 12 and the cam 10 is rotated for releasing the rim 7. A converse operation restores the rim to its operative position on the wheel body. Since the application of the rim 7 to the wheel body is substantially axially and since as will be readily understood by those familiar with demountable rim wheels, it is necessary to "rock" the rim into place by first introducing the valve stem through the usual valve stem opening, it is desirable to locate the valve stem opening, as seen at 16, adjacent the point of location of the cam 10, so that when the valve stem is introduced through the opening 16 the plates 9 will be properly located in operative relation with respect to the cam 10. The rim 7 is, of course, provided with the valve stem opening 17 located to correspond in spacing with the location of opening 16 for insuring the proper positioning of the plates 9 with respect to the cam 10.

What I claim is:—

1. In a wheel structure of the demountable rim type, the combination of a felly band having a supporting stop flange and wedge plates spaced substantially equidistant about the outer surface of the felly band and disposed alternately adjacent the outer and inner edges of the felly band, each wedge plate being formed with an inclined plane exposed in a general direction toward the supporting stop flange, and a demountable rim of greater diameter than the exterior surface of the felly band but of less diameter than the supporting stop flange, the said rim being provided with wedge plates similar in form and relative location and correspondingly spaced and each having an inclined plane exposed in a general direction away from the supporting stop flange, the said wedge plates being proportioned and located for having the inclined planes of those of the rim engage the inclined planes of those of the felly band for causing the demountable rim to be moved to a tensioned position in engagement with the supporting stop flange when shifted in a rotary direction after contact of said inclined planes.

2. In a wheel structure of the demountable rim type, the combination of a felly band having a supporting stop flange and wedge plates spaced substantially equi-distant about the outer surface of the felly band and disposed alternately adjacent the outer and inner edges of the felly band, each wedge plate being formed with an inclined plane exposed in a general direction toward the supporting stop flange, and a demountable rim of greater diameter than the exterior surface of the felly band but of less diameter than the stop flange, the said rim being provided with wedge plates similar in form and relative location and correspondingly spaced and each having an inclined plane exposed in a general direction away from the supporting stop flange, the said wedge plates being proportioned and located for having the inclined planes of those of the rim engage the inclined planes of those of the felly band for causing the demountable rim to be moved to a tensioned position in engagement with the supporting stop flange when shifted in a rotary direction after contact of said inclined planes, and means for thus shifting the demountable rim.

3. In a wheel structure of the demountable rim type, the combination of a felly band having a supporting stop flange and wedge plates spaced substantially equi-distant about the outer face of the felly band and disposed alternately adjacent the outer and inner edges of the felly band, each wedge plate being formed with an inclined plane exposed in a general direction toward the supporting stop flange, and a demountable rim of greater diameter than the exterior surface of the felly band but of less diameter than the stop flange, the said rim being provided with wedge plates similar in form and relative location and correspondingly spaced and each having an inclined plane exposed in a general direction away from the supporting stop flange, the said wedge plates being proportioned and located for having the inclined planes of those of the rim engage the inclined planes of those of the felly band for causing the demountable rim to be moved to a tensioned position in engagement with the supporting stop flange when shifted in a rotary direction after contact of said inclined planes, and means for thus shifting the demountable rim and for locking the demountable rim against reverse shifting.

4. In a wheel structure of the demountable rim type, the combination of a felly band having a supporting stop flange and wedge plates spaced substantially equi-distant about the outer face of the felly band and disposed alternately adjacent the outer and inner edges of the felly band, each wedge plate being formed with an inclined plane exposed in a general direction toward the supporting stop flange, and a demountable rim of greater diameter than the exterior surface of the felly band but of less diameter than the stop flange, the said rim being provided with wedge plates similar in form and relative location and correspondingly spaced and each having an inclined plane exposed in a general direction away from the supporting stop flange, the said wedge plates being proportioned and located for having the inclined planes of those of the rim engage the inclined planes of those of the felly band for causing the demountable rim to be moved to a tensioned position in engagement with the supporting stop flange when shifted in a rotary direction after contact of said inclined planes, and a cam disposed to engage the demountable rim for thus shifting the demountable rim.

In testimony whereof I affix my signature in presence of two witnesses.

LOUIS H. PERLMAN.

Witnesses:
EDGAR M. KITCHIN,
I. B. LEIBSON.